(12) United States Patent
Hager

(10) Patent No.: US 8,012,393 B2
(45) Date of Patent: Sep. 6, 2011

(54) METHOD FOR MANUFACTURING A MULTI-SHOT MOLDED COMPONENT

(75) Inventor: Richard A. Hager, Commerce Township, MI (US)

(73) Assignee: Magna International of America, Aurora (CA)

( * ) Notice: Subject to any disclaimer, the term of this patent is extended or adjusted under 35 U.S.C. 154(b) by 328 days.

(21) Appl. No.: 11/949,489

(22) Filed: Dec. 3, 2007

(65) Prior Publication Data

US 2008/0128943 A1    Jun. 5, 2008

Related U.S. Application Data

(60) Provisional application No. 60/868,202, filed on Dec. 1, 2006.

(51) Int. Cl.
*B29C 43/18* (2006.01)
(52) U.S. Cl. ......................... 264/255; 264/251
(58) Field of Classification Search .................. 264/251, 264/255
See application file for complete search history.

(56) References Cited

U.S. PATENT DOCUMENTS

| | | | | |
|---|---|---|---|---|
| 5,618,485 A * | 4/1997 | Gajewski | ...................... | 264/255 |
| 5,782,342 A * | 7/1998 | Hewitt et al. | .................. | 200/331 |
| 6,402,189 B1 * | 6/2002 | Gray et al. | .................. | 280/728.3 |
| 2002/0117834 A1 * | 8/2002 | Hier et al. | .................. | 280/728.2 |
| 2005/0121818 A1 * | 6/2005 | Cowelchuk et al. | .......... | 264/138 |
| 2005/0167954 A1 * | 8/2005 | Gray et al. | .................. | 280/728.3 |
| 2005/0248055 A1 * | 11/2005 | Youngs et al. | ................ | 264/250 |

* cited by examiner

*Primary Examiner* — Joseph S Del Sole
*Assistant Examiner* — Kimberly A Stewart
(74) *Attorney, Agent, or Firm* — Honigman Miller Schwartz and Cohn LLP

(57) ABSTRACT

A method for manufacturing a multi-shot interior trim component within a mold tool, comprising the steps of moving a first mold portion adjacent a second mold portion to define a potential cavity volume; modifying the potential cavity volume to define a first reduced cavity volume; depositing a first material in the first reduced cavity volume; further modifying the potential cavity volume to define a second reduced cavity volume, wherein at least a localized portion of the first deposited material is utilized to define, with the mold tool, the second reduced cavity volume; providing a rib on one of the first and second mold portions; exposing the rib to one of the first and second reduced cavity volumes; depositing a second material in the second reduced cavity volume; attaching the second deposited material to the first deposited material at least proximate the localized portion of the first deposited material, wherein one of the first and second materials defines a substrate portion having an outboard surface, an inboard surface, a chute portion extending from the outboard surface, wherein the chute portion defines an axial opening, and, wherein, the other of the first and second materials defines an inflatable restraint door that closes-out the axial opening formed in the substrate portion to define an interior trim component of a vehicle; and defining the inflatable restraint door to include a pre-weakened portion corresponding to the rib of one of the first and second mold portions.

9 Claims, 6 Drawing Sheets

METHOD FOR MANUFACTURING A MULTI-SHOT MOLDED COMPONENT

RELATED APPLICATIONS

This application claims the benefit of earlier filed U.S. Provisional Application Ser. No. 60/868,202, filed Dec. 1, 2006, which is incorporated herein by reference in its entirety.

BACKGROUND

1. Technical Field

The invention relates to a method for manufacturing a multi-shot component and to a method for manufacturing a multi-shot interior trim panel that forms an inflatable restraint door integrated with the trim panel.

2. Description of Related Art

It is known in the art that inflatable restraints, which are commonly referred to as "airbags," have been included in automotive vehicles to reduce the potential for occupant injury during an accident situation. It is also known in the art that the design of automotive interior trim panels, such as, for example, instrument panels, have included pre-weakened areas, chute portions, and the like relative a mounting location of the inflatable restraint.

When including an inflatable restraint behind an instrument panel, conventional instrument panel assemblies have often included one or more layers in a multi-layer structure that included, for example, a rigid substrate layer, an intermediate foam layer, and a skin layer. One or more of these layers may be pre-weakened and include a reinforcing scrim, steel plate, or the like disposed there-between to define an inflatable restraint door integrated with the instrument panel that permits passage of the inflatable restraint there-through when the inflatable restraint is inflatably-expanded into the passenger compartment area on the opposite side of the instrument panel.

Due to competitive design standards in the automotive industry, customer demand has resulted in the expectation that interior trim panels, such as, for example, instrument panels, have a seamless inflatable restraint door (i.e. the instrument panel appears to have a continuous surface without any parting lines to visibly-locate and identify an inflatable restraint door). To achieve this design, it is known in the art that conventional interior trim panels include pre-weakened tear seams or strips that are formed in the outboard surface of the interior trim panel.

In addition to these design expectations, global competitive forces demand that material and manufacturing costs are reduced to provide a supplier and manufacturer with a profit. As such, a need currently exists to provide an interior trim panel that is reduced in components and manufacturing/design complexity while also maintaining, if not improving, overall performance of the interior trim panel.

BRIEF DESCRIPTION OF THE DRAWINGS

The present disclosure will now be described, by way of example, with reference to the accompanying drawings, in which.

DETAILED DESCRIPTION

The figures illustrate an exemplary embodiment of a method for manufacturing a multi-shot component, such as, for example, an interior trim panel in accordance with an embodiment of the invention. In an embodiment, the interior trim panel includes a first material that is shaped to provide an opening that permits passage of an inflatable restraint through the interior trim panel and a second material that is disposed over the opening formed in the first material to provide a closure panel/inflatable restraint door that closes-out the opening formed in the interior trim panel.

For brevity, the disclosure hereof will illustrate and describe an interior trim panel that provides an instrument panel having an inflatable restraint door, but it is appreciated that the interior trim panel could be shaped to define any type of an interior trim panel other than an instrument panel, such as, for example, door panels, a headliner trim panel, center consoles, overhead consoles, a pillar trim panel, or the like that seamlessly provides an inflatable restraint door in the interior trim panel. Based on the foregoing, it is to be generally understood that the nomenclature used herein is simply for convenience and the terms used to describe the invention should be given the broadest meaning by one of ordinary skill in the art.

Figure 1:
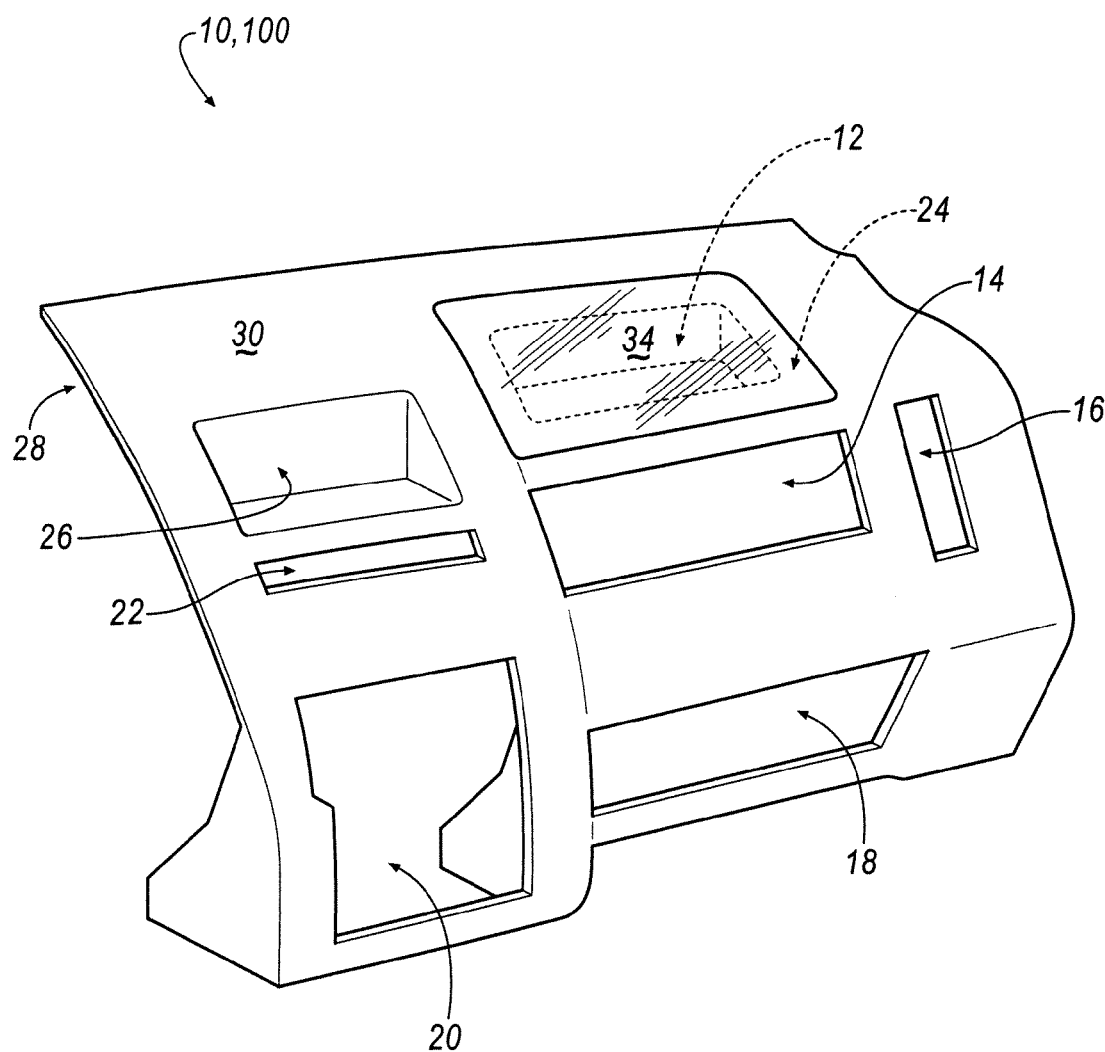
FIG. 1 is a perspective view of a multi-shot trim component including a seamless inflatable restraint door in accordance with an exemplary embodiment of the invention.

Referring now to FIG. 1, an interior trim panel is shown generally at 10, 100 according to an embodiment. According to the illustrated embodiment, the interior trim panel 10, 100 is an instrument panel including a plurality of openings that are shown generally at 12-22 and one or more recessed bezels (i.e., one or more depressions) that are shown generally at 24, 26. Although the interior trim panel 10, 100 is shaped to form an instrument panel, it will be appreciated that the invention not limited to an instrument panel and that the interior trim panel 10, 100 may include, for example, door panels, a headliner trim panel, center consoles, overhead consoles, a pillar trim panel, or the like.

As is known in the art, an instrument panel 10, 100 is installed on a frame (not shown) proximate an area underneath a windshield (not shown) and between the engine compartment (not shown) and a passenger compartment (not shown) of a vehicle. According to an embodiment, the instrument panel 10, 100 includes an engine-compartment-facing outboard side 28 and a passenger compartment-facing inboard side 30 that places, within reach and direct sight of the occupants of the vehicle, a plurality of components/devices (not shown) associated with the plurality of openings 12-22 and the one or more recessed bezels 24, 26. According to an embodiment, the inboard side 30 may include an aesthetically pleasing color and texture, such as, for example, a soft, elastic feel, or alternatively, a relatively hard, rigidified feel, or, alternatively, a combination of a soft and hard feel.

As illustrated in FIG. 1, the openings 12-22 formed in the instrument panel 10, 100 may provide a variety of features that may be controlled, manipulated, adjusted, or otherwise interfaced with by a passenger. For example, the opening 12 may provide a passage that permits an inflatable restraint 11 (FIGS. 4A and 4B) to inflate and pass there-through from the outboard side 28 of the instrument panel 10, 100 to the inboard side 30 of the instrument panel 10, 100. According to an embodiment, the remaining openings 14-22 may provide an air duct port for a heating-ventilation-and-air-conditioning (HVAC) system, an opening for a storage receptacle, such as, for example, a glove box, an opening for mounting radio/compact disc (CD)/digital video disc (DVD)/HVAC controls, and the like. The bezel 26 may form a depression in the inboard side 30 of the instrument panel 10, 100 to provide a map pocket, coin tray, ash tray, or the like. Although certain features related to the openings 14-22 and bezel 26 are listed above, it will be appreciated that other features and equivalents thereof associated with the features described above may be included with the instrument panel 10, 100, as desired.

Figure 2:
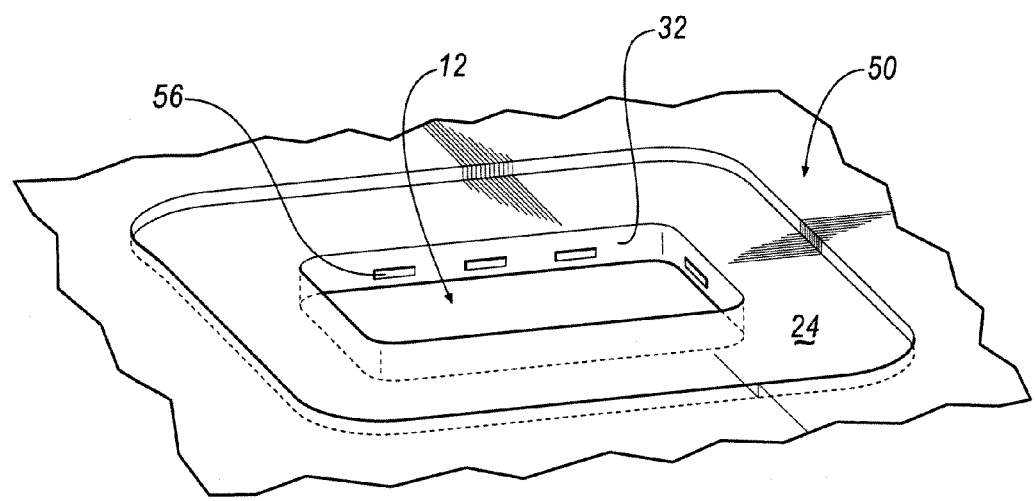
FIG. 2 is a partial perspective view of a partially-formed a multi-shot trim component of FIG. 1 including a first material in accordance with an exemplary embodiment of the invention.
Figure 3:
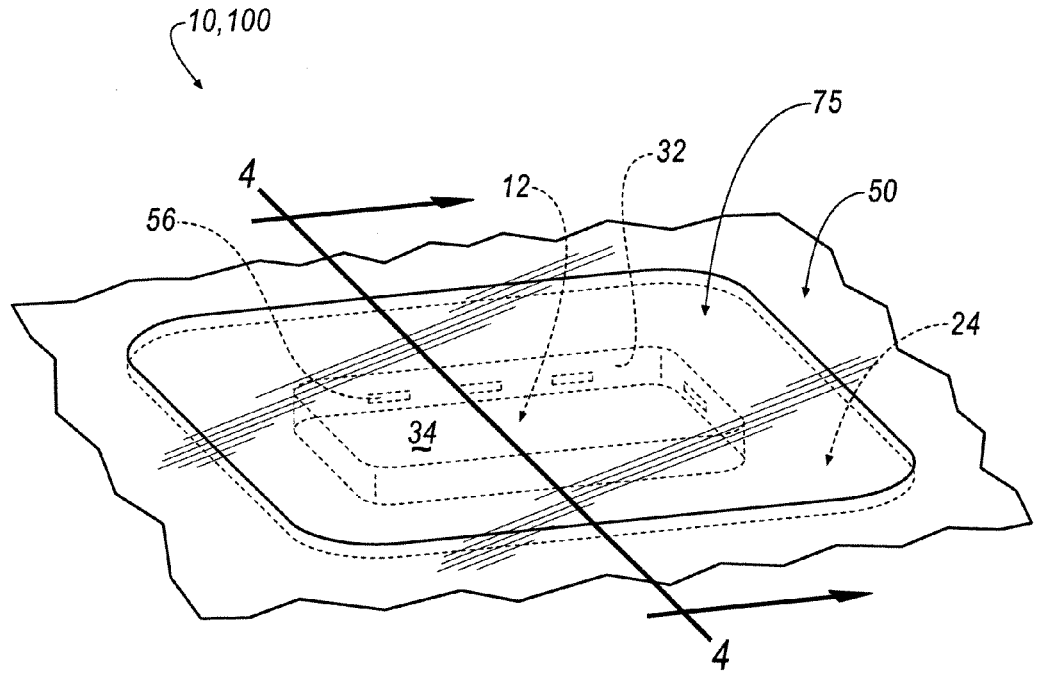
FIG. 3 is a partial perspective view of the partially-formed the multi-shot trim component of FIG. 2 including a second material to form the a multi-shot trim component of FIG. 1 in accordance with an exemplary embodiment of the invention.

Referring now to FIGS. 2 and 3, an enlarged view of the instrument panel 10, 100 is shown according to an embodiment. Referring first to FIG. 2, a partially-formed view of the instrument panel 10, 100 is shown whereby the partially-formed instrument panel is shown to include a first material 50 that is shaped to provide the opening 12 and the bezel 24. Referring to FIG. 3, a fully-formed instrument panel 10, 100 is shown to include a second material 75 that is provided in and extends across the bezel 24 thereby closing-out the opening 12 formed by the first material 50.

Figure 4A:
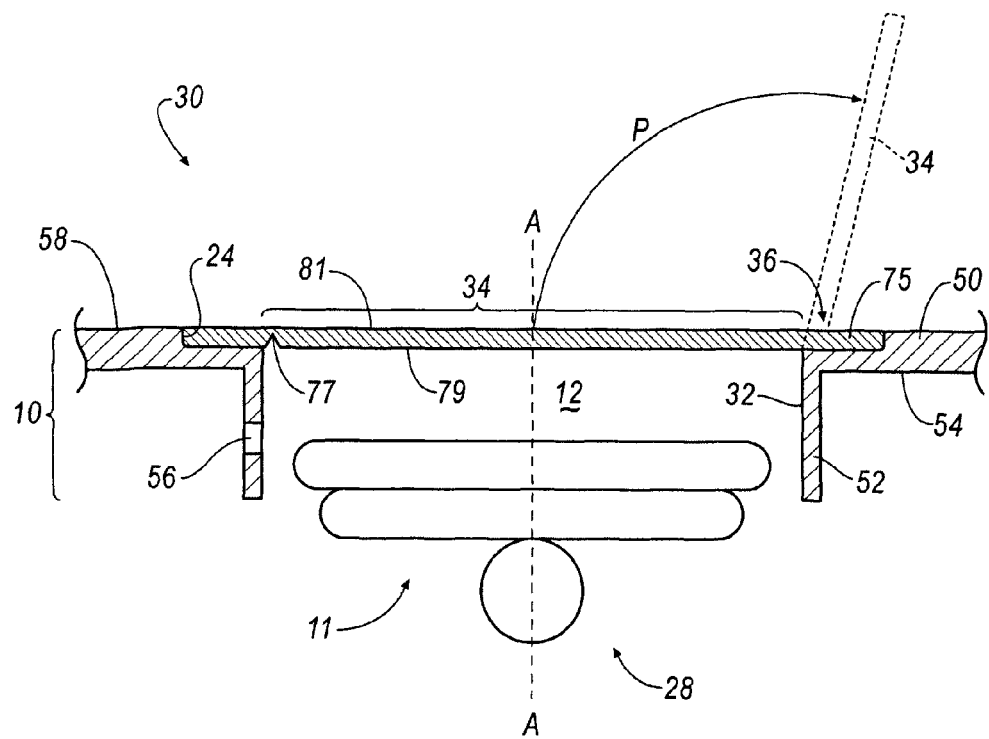
FIG. 4A is a cross-sectional view of the multi-shot trim component of FIG. 3 according to line 3-3 in accordance with an exemplary embodiment of the invention.
Figure 5B:
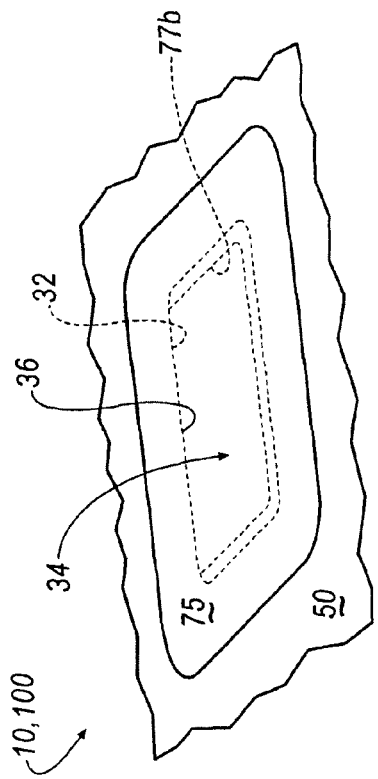
FIGS. 5A-5D each illustrate partial perspective views of the multi-shot trim component of FIG. 1 in accordance with an exemplary embodiment of the invention.
Figure 5D:
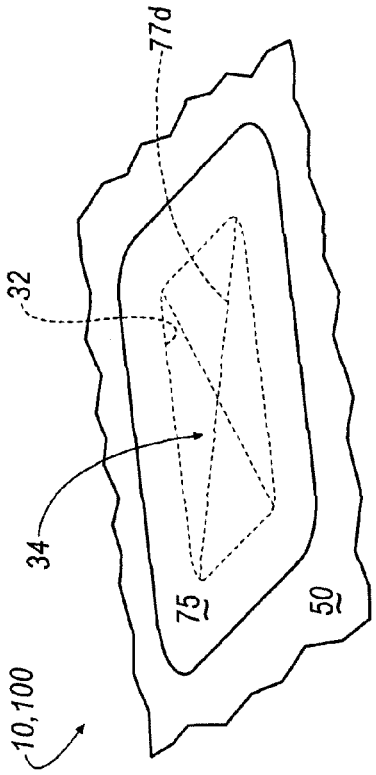
Figure 5A:
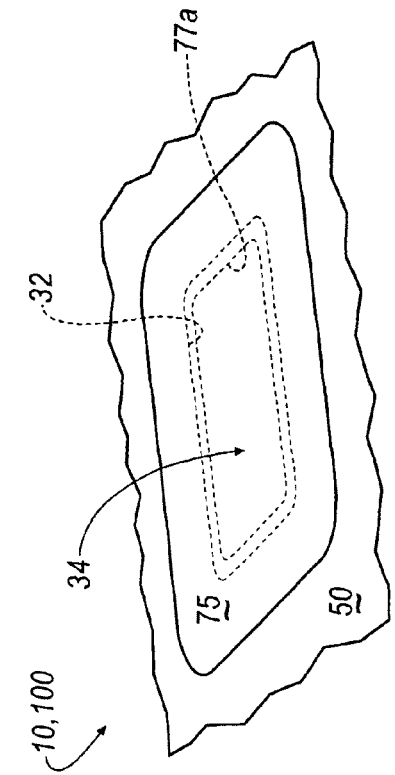
Figure 5C:
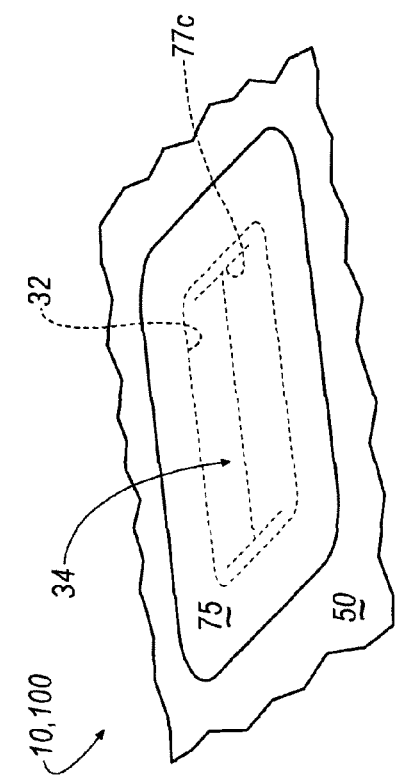

Referring to FIG. 4A, the second material 75 is shown extending across the bezel 24 and including one or more pre-weakened portions 77 formed in an outboard side 79 of the second material 75. As illustrated, the one or more pre-weakened portions 77 are formed proximate a perimeter 32 of the opening 12. According to an embodiment, as illustrated in FIGS. 5A-5D, one or more pre-weakened portions 77a-77d may be formed proximate the perimeter 32 in a square/rect-angle shape 77a (FIG. 5A), a U-shape 77b (FIG. 5B), an H-shape 77c (FIG. 5C), or an X-shape 77d (FIG. 5D). Referring to FIG. 4A, according to an embodiment, the one or more pre-weakened portions 77 may include a V-shaped notch extending into the outboard side 79 of the second material 75 but not through to an inboard side 81 of the second material 75.

Although shown in cross-section in FIG. 4A, it will be appreciated that the one or more pre-weakened portions 77 may include a continuous V-shaped notch extending in the pattern 77a-77d proximate that of the perimeter 32 of the opening 12, or, alternatively, the one or more pre-weakened portions 77 may include a series of interrupted V-shaped notches that form the pattern 77a-77d proximate the perimeter 32 of the opening 12. However, it will be appreciated that a continuous V-shape, or, a series of V-shaped interruptions may include any desirable pattern as desired, such as, for example a U-, H-, or X-shape as described above.

Even further, it will be appreciated that the pre-weakened portion 77 is not limited to a V-shape formed in the outboard side 79 of the second material 75 and that the pre-weakened portion 77 may include any desirable shape, such as, for example, a slit, cut, or notch having any desirable shape. According to an embodiment, the outboard side 79 of the second material 75 may be in-molded, laser-scored, cut, trimmed, or the like to provide the pre-weakened portion 77.

Figure 4B:
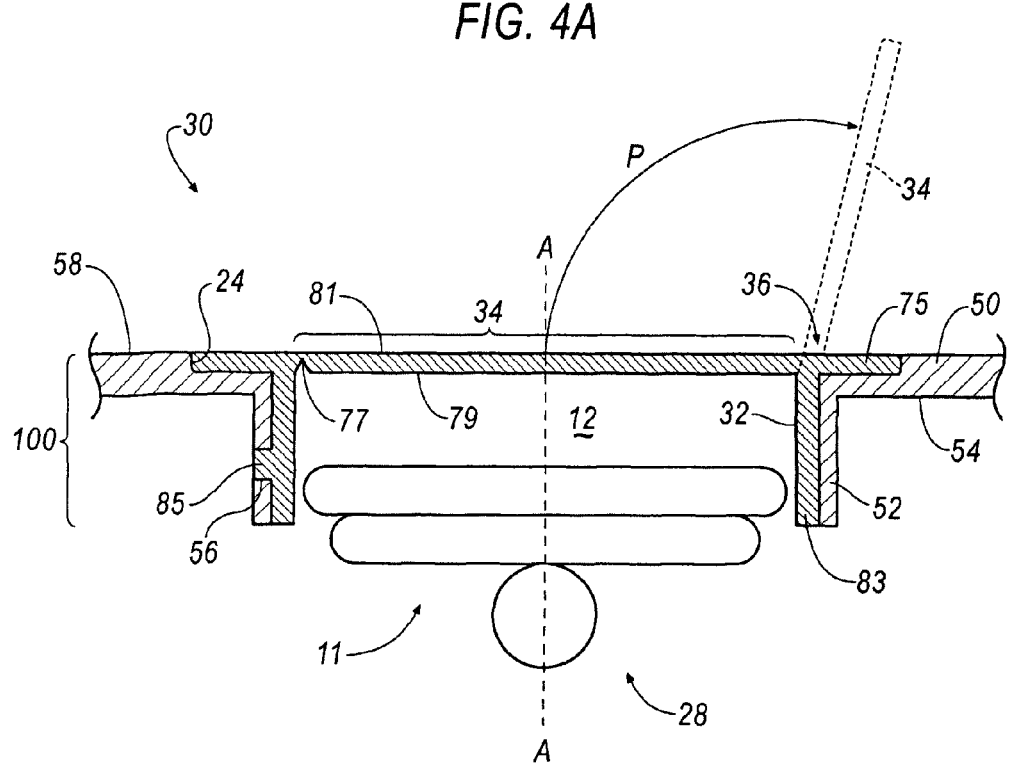
FIG. 4B is a cross-sectional view of the multi-shot trim component of FIG. 3 according to line 3-3 in accordance with an exemplary embodiment of the invention.

Referring to FIG. 4B, an instrument panel 100 is shown according to an embodiment. Similar to the instrument panel 10 of FIG. 4A, the instrument panel 100 includes a first material 50 that forms the opening 12 and a second material 75 that extends across the bezel 24 and including one or more pre-weakened portions 77 formed in an outboard side 79 of the second material 75 as described above. In addition, the second material 75 is also shown extending, according to an embodiment, in a substantially perpendicular direction, away from the outboard side 79, thereby forming a chute liner portion 83. As illustrated, the chute liner portion 83 is formed adjacent a chute portion/support 52 formed by the first material 50. As illustrated, the chute portion/support 52 extends, according to an embodiment, in a substantially perpendicular direction, away from an outboard side 54 of the first material 50.

According to an embodiment, the chute portion/support 52 includes one or more radial openings 56 that extend through the chute support 52 relative an axis, A-A, that extends axially through the opening 12. The one or more radial openings 56, which are also shown in FIG. 4A, may be utilized for any desirable purpose. According to an embodiment, as illustrated in FIG. 4B, the one or more radial openings 56 formed in the instrument panel 100 may receive a flange 85 that extends, according to an embodiment, in a substantially perpendicular direction, away from the chute liner portion 83 of the second material 75. According to an embodiment, the one or more radial openings 56 may function in receiving a fastener (not shown) that fastens the inflatable restraint 11 to the instrument panel 10.

As such, because the instrument panel 10, 100 includes the second material 75 having one or more pre-weakened portions 77, the second material 75 provides an inflatable restraint door 34 that permits the inflatable restraint 11 to inflate and pass through the chute portion/support 52 and/or chute liner portion 83 and out to the inboard side 30 of the instrument panel 10, 100. Accordingly, if the one or more pre-weakened portions 77 is/are formed to include, for example, a U-shape 77b (FIG. 5B), the door 34 may provide a hinge portion 36. As shown in FIGS. 4A and 4B, when the inflatable restraint 11 is deployed, the inflatable restraint door 34 (also shown in phantom), may pivot about the hinge portion 36 according to the pivoting arc, P.

The first material 50 may include, according to an embodiment, a substantially rigid substrate material, such as, for example, a thermoplastic elastomer, a thermoplastic elastomer polyolefin, a polycarbonate, a polypropylene, an acrylonitrile butadiene styrene (ABS), a polycarbonate acrylonitrile butadiene styrene PC-ABS, a styrene maleic anhydride (SMA), a polyphenylene oxide (PPO), a nylon, a polyester, an acrylic, a polysulfone, or thermoplastic olefin (TPO). According to an embodiment, the first material may include an ABS-PC blend.

According to an embodiment, the second material 75 is a substantially softer material in comparison to the rigidified characteristic of the first material 50, and may include any desirable material, such as, for example, a polymer, a synthetic rubber, a thermoplastic elastomer (TPE), a thermoplastic elastomer olefin (TPO), or polycarbonate (PC). According to an embodiment, the second material 75 may include a PC material. According to an embodiment, the second material 75 may be a PC siloxane copolymer resin that offers low temperature ductility (e.g., at approximately −40° C.) in combination with excellent processability and release with properties for shorter mold tool cycles times. According to an embodiment, the second material 75 may be a copolymer resin that is commercially available from General Electric Company of NY, N.Y. and sold under the trade-name LEXAN®.

According to an embodiment, because an inboard sides 58, 81 of the first and second materials 50, 75 define the inboard side 30 of the instrument panel 10, 100, the inboard sides 58, 81 may include a substantially similar color, appearance, and/or texture to provide an aesthetically-pleasing show- or A-surface that is visually and/or texturally-pleasing for vehicle passengers and/or vehicle enthusiasts. However, it will be appreciated that the inboard side 58, 81 of the first and second materials 50, 75 may include a different color, appearance, and/or texture quality in comparison with one another. Even further, it will be appreciated that, according to an embodiment, the first and second materials 50, 75 may, in combination, provide a substrate layer that receives one or more of a foam layer (not shown) and/or skin layer (not shown) over the inboard side 30 of the instrument panel 10, 100.

Referring now to FIGS. 6A-6C and 7A-7C, a method for manufacturing the instrument panel 10, 100 is shown according to an embodiment. According to an embodiment, the first material 50 is attached or otherwise bonded to the second material 75 by using any desirable methodology.

According to an embodiment, the first and second materials 50, 75 are attached at least at a first portion proximate the bezel 24 (see, e.g. FIG. 4A). According to an embodiment, the attachment of the first and second materials 50, 75 at least proximate the bezel 24 may include, for example, a chemical bond, an adhesive bond, or the like. However, it will be appreciated that the invention is not limited to a chemical bond, an adhesive bond, or the like and that the invention may be practiced utilizing any type of attachment as desired.

According to an embodiment, the first and second materials 50, 75 are attached at least at a first portion proximate the bezel 24 and at least at a second portion proximate the chute portion/support 52 (see, e.g., FIG. 4B). According to an embodiment, the attachment of the first and second materials 50, 75 at least proximate the bezel 24 and chute portion/support 52 may include, for example, a chemical bond, an adhesive bond, a mechanical bond, or the like. However, it will be appreciated that the invention is not limited to a chemical bond, an adhesive bond, a mechanical bond, or the like and that the invention may be practiced utilizing any type of attachment as desired.

Figure 6A:
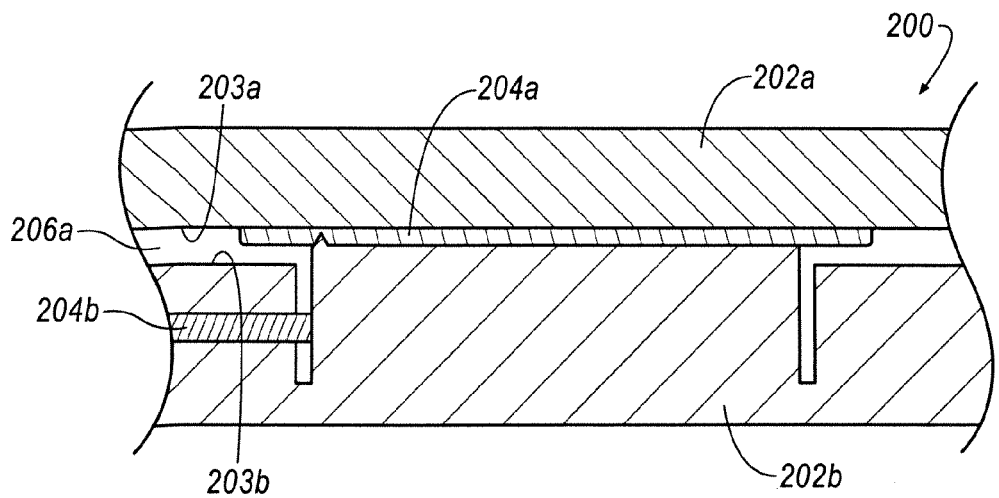
FIGS. 6A-6C illustrate a method for manufacturing the multi-shot trim component of FIG. 1 in accordance with an exemplary embodiment of the invention.
Figure 6B:
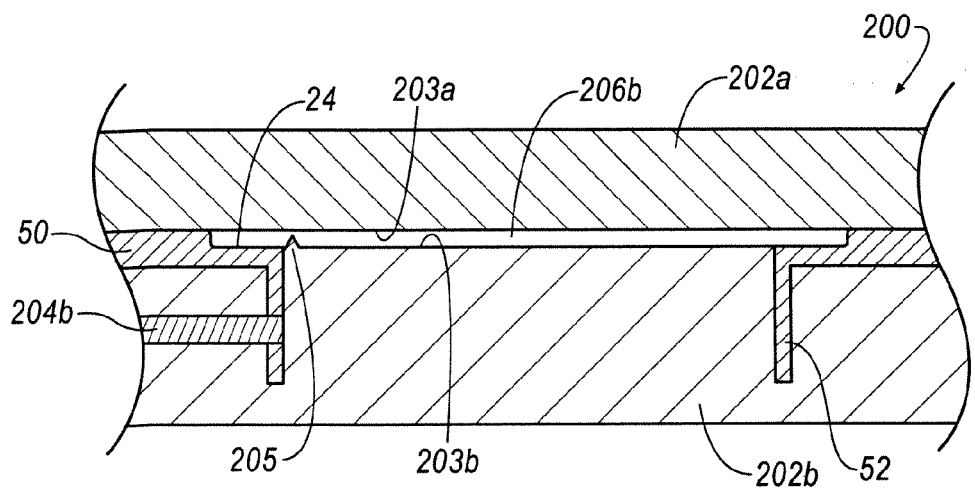
Figure 6C:
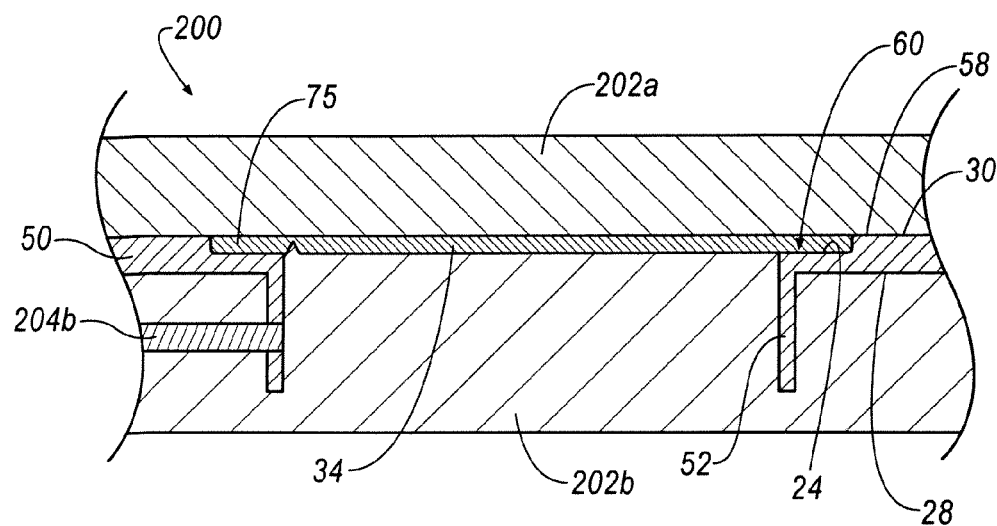
Figure 7A:
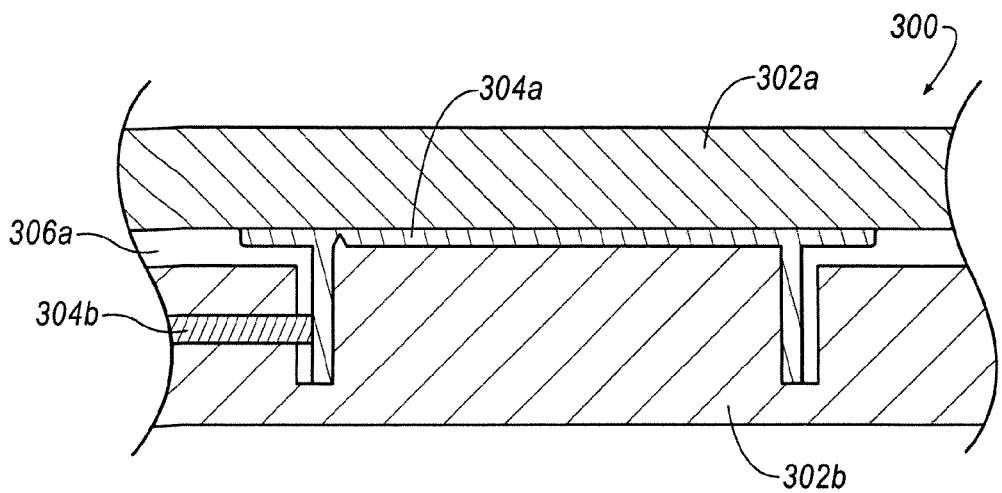
FIGS. 7A-7C illustrate a method for manufacturing the multi-shot trim component FIG. 1 in accordance with an exemplary embodiment of the invention.
Figure 7B:
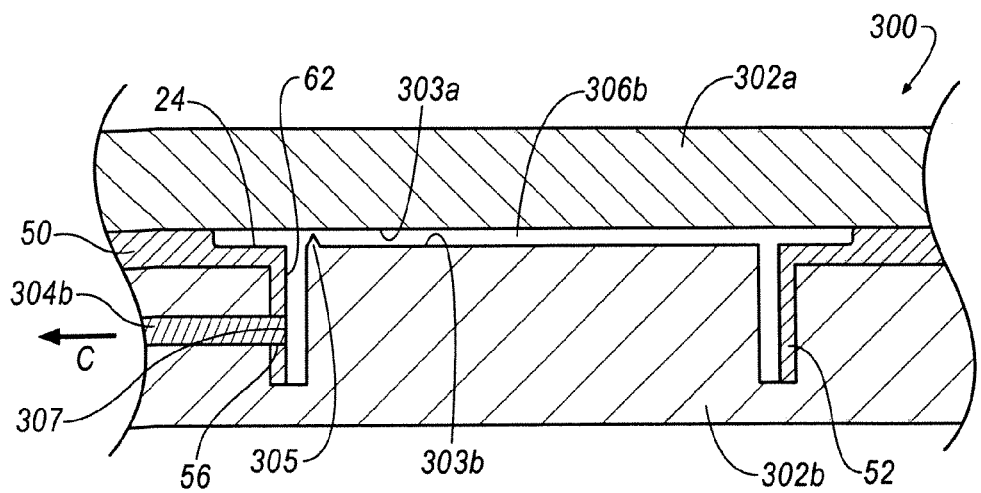
Figure 7C:
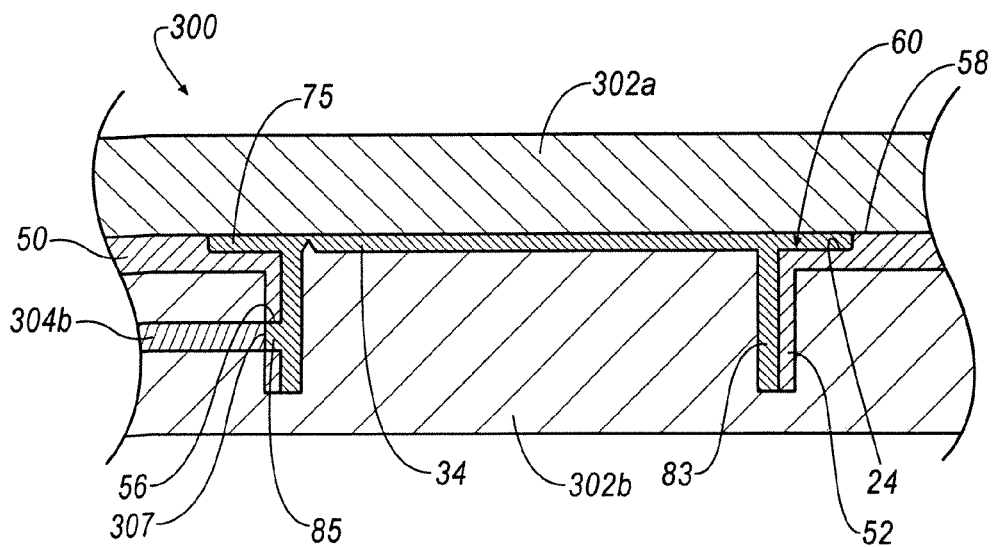

According to an embodiment, selection of the first and second materials 50, 75 may provide the attachment as described above when the first and second materials 50, 75 are provided in a mold tool 200 (FIGS. 6A-6C), 300 (FIGS. 7A-7C). According to an embodiment, the attachment of the first and second materials 50, 75 is provided by way of multi-shot molding/over-molding process. Because the illustrated embodiment includes a first and second material 50, 75, the multi-shot molding process may be referred to as a two-shot molding process.

Referring first to FIGS. 6A-6C, the mold tool 200 includes first and second mold halves 202a, 202b and one or more mold core components 204a, 204b that form the instrument panel 10 of FIG. 4A. Although two mold core components 204a, 204b are shown, it will be appreciated that the mold tool 200 may include any desirable number of mold core components that shift and change positioning to re-define a cavity volume 206a (FIG. 6A), 206b (FIG. 6B) of the mold tool 200 before, during, or after the mold halves 202a, 202b are moved to place the mold tool 200 in a closed position.

First, as seen in FIG. 6A, the first and second mold halves 202a, 202b are moved adjacent one another to place the mold tool 200 in a closed position As illustrated, the first mold half 202a includes a surface 203a that substantially defines an outboard side 58 of the first material 50. Correspondingly, the second mold half 202b includes a surface 203b that substantially defines an inboard side 54 of the first material 50

Referring still to FIG. 6A, the first and second core components 204a, 204b are shown in a first position prior to depositing a shot of the first material 50. As illustrated, the mold halves 202a, 202b and first and second core components 204a, 204b define the first cavity volume 206a. The first cavity volume 206a, according to an embodiment, is substantially equal to a volume of a first shot of a first material 50 that is used to fill the first cavity volume 206a to form the rigid substrate of the instrument panel 10 including the plurality of openings 12-22, the one or more recessed bezels 24, 26, chute portion/support 52, and one or more radial openings 56. As illustrated, the second core component 204b is provided to form the one or more radial openings 56 extending through the chute portion/support 52.

Referring now to FIG. 6B, once the first material 50 substantially cures to partially or completely harden in the first cavity volume 206a, or, alternatively, when the first material 50 is still in a reactive state (i.e. the first material 50 is tacky or not substantially hardened), the first core component 204a is retracted to expose the recessed bezel 24 that is provided by the first material 50. As such, the recessed bezel 24 and portions of the surfaces 203a, 203b of the mold halves 202a, 202b define the second cavity volume 206b that is substantially equal to a volume of a second shot of a second material 75. As illustrated, the surface 203b also includes a V-shaped ridge 205 that may be utilized to in-mold the one or more pre-weakened portions 77 when the shot of the second material 75 is deposited.

As seen in FIG. 6C, the shot of second material 75 is deposited and fills the second cavity volume 206b to provide the inflatable restraint door 34. According to an embodiment, the shot of second material 75 attaches to a localized portion 60 of the inboard side 58 of the first material 50, particularly within and filling the recessed bezel 24. When the shot of the second material 75 attaches to a localized portion 60 of the shot of first material 50, the instrument panel 10 is formed such that the shot of the second material 75 closes-out the opening 12 defined by the chute portion/support 52. As such, the shot of the second material 75 is provided over the shot of the first material 50 in a localized manner such that an inboard surface 30 of the instrument panel 10 is provided to define a seamless inflatable restraint door 34.

Referring now to FIGS. 7A-7C, the mold tool 300 includes first and second mold halves 302a, 302b and one more mold core components 304a, 304b that form the instrument panel 100 of FIG. 4B. The mold halves 302a, 302b and mold core components 304a, 304b function substantially similarly to the first and second mold halves 202a, 202b and the one or more mold core components 204a, 204b, but, however, include variations to accommodate the second shot of second material 75 that defines the chute liner portion 83 and flange 85 that extends from the chute liner portion 83.

Referring to FIG. 7A, the first and second core components 304a, 304b are shown in a first position prior to the depositing of the shot of the first material 50. As illustrated, the mold halves 302a, 302b and first and second core components 304a, 304b define the first cavity volume 306a. The first cavity volume 306a, according to an embodiment, is substantially equal to a volume of a first shot of a first material 50 that is used to fill the first cavity volume 306a to form the rigid substrate of the instrument panel 100 including the plurality of openings 12-22, the one or more recessed bezels 24, 26, chute portion/support 52, and one or more radial openings 56. As illustrated, the second core component 304b is provided to form the one or more radial openings 56 extending through the chute portion/support 52.

Referring now to FIGS. 7A and 7B, once the first material 50 substantially cures to partially or completely harden in the first cavity volume 306a, the first core component 304a is retracted to expose the recessed bezel 24 and an inner periphery wall 62 of chute portion/support 52 that is provided by the first material 50. Then, the second core component 304b is retracted according to the direction of the arrow, C, to expose the one or more radial openings 56 (FIG. 7C). As such, the recessed bezel 24, the one or more radial openings 56, inner periphery wall 62, portions of the surfaces 303a, 303b of the mold halves 302a, 302b, and an end 307 of the second mold core 304b defines the second cavity volume 306b that is substantially equal to a volume of a second shot of a second material 75. As illustrated, the surface 303b also includes a V-shaped ridge 305 that may be utilized to in-mold the one or more pre-weakened portions 77 in the shot of the second material 75.

As seen in FIG. 7C, the shot of second material 75 that fills the second cavity volume 306b provides the inflatable restraint door 34. According to an embodiment, the shot of second material 75 attaches to the localized portion 60 of the inboard side 58 of the first material 50, particularly within and filling the recessed bezel 24. Additionally, because the shot of second material 75 fills the one or more radial openings 56, the shot of the second material 75 also attaches to the chute portion/support 52. Thus, when the shot of the second material 75 attaches to the shot of the first material 50 as described above, the instrument panel 100 is formed and the shot of the second material 75 closes-out the opening 12 defined by the chute portion/support 52. As such, the shot of the second material 75 is provided over the shot of the first material 50 in a localized manner such that an inboard surface 30 of the instrument panel 10 is provided and defines a seamless inflatable restraint door 34.

It will be appreciated that the inventive multi-shot method for manufacturing the instrument panel 10, 100 is not limited to the mold tools 200, 300. For example, although the subject invention involves the use of a mold tool 200, 300 that includes a cavity volume 206a, 206b, 306a, 306b, the invention is not limited by the number of volumes 206a, 206b, 306a, 306b in which the mold tool 200, 300 can be altered, and that the invention can be practiced with a cavity volume 206a, 206b, 306a, 306b that may be altered into any desirable number of volumes needed to form the component.

In addition, there are a variety of techniques, in addition to movable mold cores 204a, 204b, 304a, 304b, that permit altering of the cavity volume 206a, 206b, 306a, 306b from a first volume to another different volume. Such techniques may include, for example, the use of a moveable slide, transfer molding, or even the use of a rotating platen. However, it will be appreciated that any desirable technique is appropriate and that the scope of the invention is not limited to a technique for altering the shape or size of the cavity volume 206a, 206b, 306a, 306b from a first volume to another, different volume.

The present invention has been described with reference to certain exemplary embodiments thereof. However, it will be readily apparent to those skilled in the art that it is possible to embody the invention in specific forms other than those of the exemplary embodiments described above. This may be done without departing from the spirit of the invention. The exemplary embodiments are merely illustrative and should not be considered restrictive in any way. The scope of the invention is defined by the appended claims and their equivalents, rather than by the preceding description.

What is claimed is:

1. A method for manufacturing a multi-shot interior trim component within a mold tool, the method comprising:
   moving a first mold portion adjacent a second mold portion to define a potential cavity volume;
   modifying the potential cavity volume to define a first reduced cavity volume;
   depositing a first material in the first reduced cavity volume;
   further modifying the potential cavity volume to define a second reduced cavity volume, wherein at least a localized portion of the first deposited material is utilized to define, with the mold tool, the second reduced cavity volume;
   providing a rib on one of the first and second mold portions;
   exposing the rib to one of the first and second reduced cavity volumes;
   depositing a second material in the second reduced cavity volume; and
   attaching the second deposited material to the first deposited material at least proximate the localized portion of the first deposited material;
   wherein one of the first and second materials defines a substrate portion having an outboard surface, an inboard surface, and a chute portion extending from the outboard surface, the chute portion defining a chute opening and a radial opening;
   wherein the other of the first and second materials defines an inflatable restraint door that closes-out the chute opening formed in the substrate portion to define an interior trim component of a vehicle, the inflatable restraint door defining a pre-weakened portion corresponding to the rib of one of the first and second mold portions and a chute liner comprising a radial flange that extends into the radial opening and attaches to the chute portion of the substrate portion; and
   wherein the localized portion includes the chute portion and the radial opening formed in the chute portion.

2. The method according to claim 1, wherein the substrate portion is further defined to include a recessed bezel substantially circumscribing the chute opening, the inflatable restraint door disposed in the recessed bezel.

3. The method according to claim 2, wherein the localized portion includes the recessed bezel.

4. The method according to claim 2, wherein the localized portion includes the recessed bezel and the chute portion.

5. A method for manufacturing a multi-shot interior trim component within a mold tool, the method comprising:
   moving a first mold portion adjacent a second mold portion to define a potential cavity volume;
   modifying the potential cavity volume to define a first reduced cavity volume;
   depositing a first material in the first reduced cavity volume;
   further modifying the potential cavity volume to define a second reduced cavity volume, wherein at least a localized portion of the first deposited material is utilized to define, with the mold tool, the second reduced cavity volume;
   depositing a second material in the second reduced cavity volume; and attaching the second deposited material to the first deposited material at least proximate the localized portion of the first deposited material to define an interior trim component of a vehicle;

wherein one of the first and second materials defines a substrate portion having an outboard surface, an inboard surface, and a chute portion extending from the outboard surface, the chute portion defining a chute opening, a radial opening, and a recessed bezel substantially circumscribing the chute opening;

wherein the other of the first and second materials defines an inflatable restraint door that closes-out the chute opening formed in the substrate portion and is disposed in the recessed bezel, the inflatable restraint door defined to have a chute liner that attaches to the chute portion of the substrate portion, the chute liner comprising a radial flange extending into the radial opening of the substrate portion; and wherein the localized portion includes the recessed bezel, the chute portion and the radial opening formed in the chute portion.

6. The method according to claim 5, further comprising providing a means for pre-weakening the inflatable restraint door on one of the first and second mold portions.

7. The method according to claim 6, further comprising exposing the means for pre-weakening the inflatable restraint door to one of the first and second reduced cavity volumes.

8. The method according to claim 7, wherein the means includes a V-shaped rib, wherein the inflatable restraint door includes a V-shaped notch corresponding to the V-shaped rib.

9. The method according to claim 6, wherein the means includes a laser for scoring the inflatable restraint door, wherein the scoring includes a continuous line or a series of perforations.

* * * * *